E. A. IVATTS.
LENS DIAPHRAGM CONTROLLING DEVICE FOR KINEMATOGRAPHIC APPARATUS.
APPLICATION FILED SEPT. 1, 1910.
1,029,997.
Patented June 18, 1912.
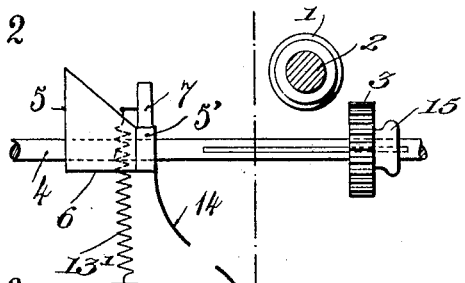
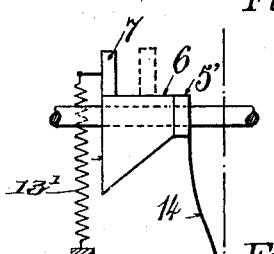
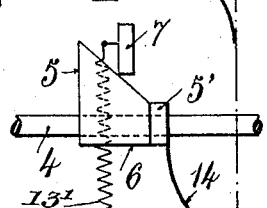
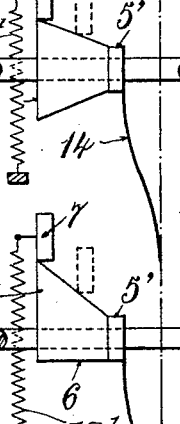
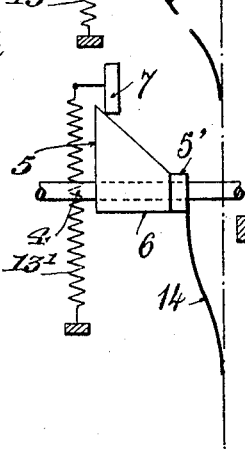
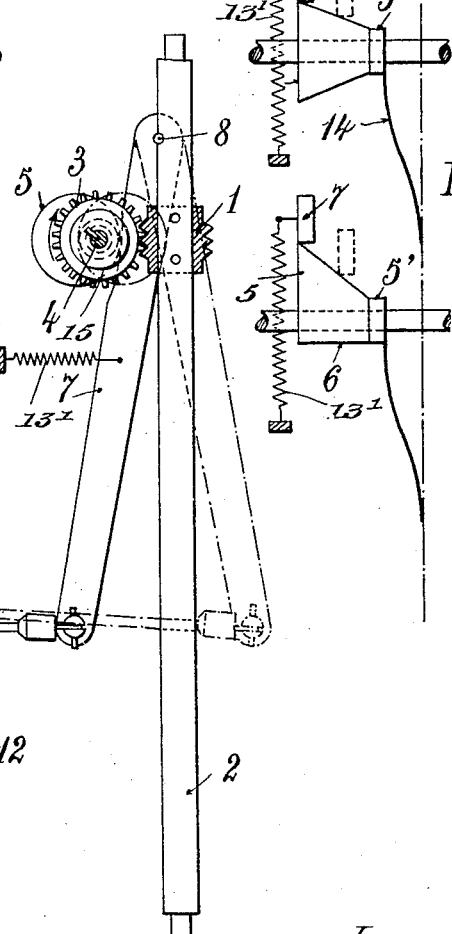
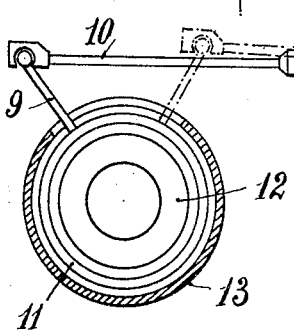
Witnesses:
Waldo M Chapin
James D'Antonis
Inventor,
Ernest Albert Ivatts.
by
Rosenbaum Stockbridge
Attys.

UNITED STATES PATENT OFFICE.

ERNEST ALBERT IVATTS, OF PARIS, FRANCE, ASSIGNOR TO SOCIETY COMPAGNIE GENERALE DE PHONOGRAPHES, CINEMATOGRAPHES ET APPAREILS DE PRECISION, OF PARIS, FRANCE.

LENS-DIAPHRAGM-CONTROLLING DEVICE FOR KINEMATOGRAPHIC APPARATUS.

1,029,997.   Specification of Letters Patent.   Patented June 18, 1912.

Application filed September 1, 1910. Serial No. 580,000.

*To all whom it may concern:*

Be it known that I, ERNEST ALBERT IVATTS, citizen of Great Britain, residing at Paris, in the Department of the Seine, France, have invented certain new and useful Improvements in Lens-Diaphragm-Controlling Devices for Kinematographic Apparatus, of which the following is a specification.

This invention refers to a mechanical device for use with photographic kinematographic apparatus whereby the operator is enabled automatically to effect the progressive appearance of one subject simultaneously with the progressive disappearance of another subject, so that when projecting the picture, the image representing the new subject gradually increases in intensity until it acquires its full intensity whereas the old image correspondingly decreases in intensity until it completely disappears. This operation may affect the whole of the image or only a portion of the same. This operation is actually effected by manipulating by hand the diaphragm of the lens. It comprises two distinct phases:

*The first phase or phase of disappearance.*—At the moment in which the image should commence to loose its intensity, that is to say to disappear, the operator begins to manipulate by hand as regularly as possible the diaphragm of the lens so as to completely close this diaphragm at the end of a certain period of time, corresponding in practice to a number of revolutions given to the crank by means of which the operator rotates the mechanism of his apparatus. When the diaphragm is completely closed, the operator stops his apparatus and turns back the portion of the film which has passed in front of the lens during the period of the closing of the diaphragm. In practice this is effected by turning back the crank through the same number of revolutions through which it was turned forward.

*Second phase or the phase of appearance.*—The first phase being terminated and during the interruption in the photographic operations, the subjects which it is desired now to photograph are placed in position on the stage of the theater. When everything is ready, the operator again actuates his apparatus at the same time progressively opening the diaphragm of the lens during the same number of revolutions of the crank as previously so that at the end of a period of time determined for the operating, the diaphragm will be opened to the same degree as at the beginning. The photographic operations are then continued in the usual way. It will be easily understood that under these conditions this progressive interchange of two subjects is a delicate operation entirely dependent on the dexterity of the operator. In practice it is very difficult to avoid false photographic shades and the appearance of the subjects instead of being produced gradually is effected in a jerky manner. The mechanical device forming the object of the present invention is for the purpose of avoiding these drawbacks by automatically effecting the gradual opening and closing of the diaphragm or any other type of obturator. It furthermore permits of effecting this gradual change of subjects with any initial position whatever of the diaphragm, dependent on the conditions of light, the operation always being effected in the same period of time determined beforehand according to requirements.

I shall now describe this invention with reference to the accompanying drawings in which—

Figure 1 shows a front view of the whole of the device. Figs. 2, 3 and 4 are views of the same profile of the cam for various positions on its shaft. Figs. 5, 6 and 7 are views of various profiles of the cam for the same position on its shaft.

Referring to Fig. 1 it may be seen that the device is driven by an endless screw 1 keyed to the shaft 2 controlling the parts of the apparatus. Owing to this arrangement the rotary speed of the parts thus actuated will depend on the number of images photographed. A cog wheel 3 axially sliding along a shaft 4, although dependent on the rotary movement of the said shaft can be made to mesh when desired with the endless screw 1, for example by means of a knob or any other device actuated by the operator at the desired moment. A cam 5 is also mounted in similar manner on the said shaft 4 along which it can slide although dependent on the rotary movement of the same. This cam 5 is preferably formed by a truncated cone with circular base, of which the one rectilineal generating line 6 is parallel to the rotary axis of the shaft 4. It is evident that for the same purpose a cam of different construction might also be employed. Thus the bases of the truncated cone instead of being circular might be elliptical or ovoid so as to permit, if necessary, of effecting the closing of the obturating diaphragm, not proportionally to the diameter of the same but proportionally to the area of the aperture in this diaphragm and consequently to the quantity of light passing on to the film. Instead of being in the form of a truncated cone with rectilineal generating lines, the cam may be of any other shape provided that it possesses a rectilineal generating line parallel to the axis of rotation, that is to say to the shaft 4. This cam 5, whatever may be its construction, acts on the arm of a lever 7 pivoted at 8. By the intermediation of a connecting rod 10 this lever actuates a lever 9 controlling the movable rim 11 of the obturating diaphragm of a lens 12 arranged in a tube 13. A suitably arranged spring 13' assures the contact of the edge of the lever 7 on the cam 5. According to the position of this latter the diaphragm of the lens 12 will be either open or closed or in any other intermediate position as shown for example in the Figs. 2 to 7. The diaphragm is closed when the lever 7 rests on the small base 5' of the cam 5 or when it rests on the part least eccentrically situated with respect to the shaft 4, that is to say at any point along the generating line 6. The diaphragm is fully opened when the lever 7 rests on the large base and on the most eccentric portions of the cams; it is partly open when the lever 7 occupies an intermediate position on the eccentric portion between the large and the small base.

As may be seen from Figs. 2, 3 and 4 by moving the cam 5 along the shaft 4, the profile remaining the same, one passes gradually from the open position of the diaphragm to the closed position.

As may be seen from Figs. 5, 6 and 7 at whatever point the lever 7 rests on the cam 5, one passes gradually during the first half of the rotation from the open to the closed position and vice versa during the second half of the rotation.

From what precedes it may be seen that the adjustment of the degree of opening of the diaphragm of the lens 12, is effected by causing the cam 5 to slide along its shaft 4 by means of suitable actuating mechanism, for example by means of a lever and an opposing spring 14.

With this device in order to obtain the progressive interchange of subjects, the operator while continuing to operate the crank with one hand presses at the desired moment on the knob or button 15 so as to cause the cog-wheel 3 to mesh with the endless screw 1 of the shaft 2. At the end of a certain number of revolutions the operator releases the button thus stopping the working of the device which has effected the closing of the diaphragm of the lens, owing to the first half rotation of the cam 5. The cam 5 is then in the position represented in Fig. 7 and the lever 7 is at the extreme left, as is also the connecting rod 10 and lever or arm 9. The operator completes the interchanging operation by pressing a second time on the button 15 during a number of revolutions equal to the previous number of revolutions. At this moment the second half rotation of the cam 5 has brought back the latter to its initial position and consequently also brought back the diaphragm of the lens 12 into its original open position; the lever 7, and rods 9 and 10 being at the extreme right.

It is evident that modifications and improvements may be introduced in this device without in any way affecting the essential features of the invention.

Having now particularly described and ascertained the nature of this said invention and in what manner the same is to be performed, I declare that what I claim is:

1. In a kinematographic apparatus, the combination of a lens-diaphragm with an automatic controlling device therefor, said device comprising a driving member and a driven member, mechanism for operatively connecting said members, said mechanism including engageable and disengageable parts, a cam carried by said driven member, and means actuated by said cam for opening and closing said lens-diaphragm.

2. In a kinematographic apparatus, the combination of a lens-diaphragm with an automatic controlling device therefor, said device comprising a driving member and a driven member, mechanism for operatively connecting said members, said mechanism including an engageable and disengageable gear and screw, a cam carried by said driven member and a lever actuated by said cam for opening and closing said lens-diaphragm.

3. In a kinematographic apparatus, the combination of a lens-diaphragm with an automatic controlling device therefor, said device comprising a driving shaft and a driven shaft, a gear on said driven shaft and an endless screw on said driving shaft, said gear and screw being engageable and disengageable, a cam shaped part carried by said driven shaft having a portion of the operative face thereof substantially in parallelism with said driven shaft and having another portion of said face inclined to the axis of said shaft, and a lens-diaphragm controlling part actuated by said cam shaped part, one of said parts being laterally displaceable with respect to the other of said parts, the amount of displacement determining the maximum opening of the diaphragm during a determined rotary movement of the driven shaft.

4. In a kinematographic apparatus, the combination of a lens-diaphragm with an automatic controlling device therefor, said device comprising a driving member and a driven member, mechanism for operatively connecting said members, said mechanism including engageable and disengageable elements, a cam shaped part carried by said driven member having a portion of the operative face thereof inclined to the axis of said driven member and having another portion of said face at an angle to said first mentioned portion, and a lens-diaphragm controlling part actuated by said cam-shaped part, one of said parts being laterally displaceable with respect to the other of said parts, the amount of displacement determining the maximum opening of the diaphragm during a determined movement of the driven member.

In testimony whereof I affix my signature in presence of two witnesses.

ERNEST ALBERT IVATTS.

Witnesses:
  HENRY DANTER,
  LUCIEN CRESPIN.

---

Copies of this patent may be obtained for five cents each, by addressing the "Commissioner of Patents, Washington, D. C."